(12) United States Patent
Abe

(10) Patent No.: US 6,992,694 B2
(45) Date of Patent: Jan. 31, 2006

(54) ELECTRONIC ENDOSCOPE APPARATUS ADAPTABLE TO ENDOSCOPES EQUIPPED WITH IMAGING DEVICE WITH DIFFERENT PIXEL DENSITY

(75) Inventor: Kazunori Abe, Saitama (JP)

(73) Assignee: Fujinon Corporation, Saitama (JP)

( * ) Notice: Subject to any disclaimer, the term of this patent is extended or adjusted under 35 U.S.C. 154(b) by 476 days.

(21) Appl. No.: 10/032,715

(22) Filed: Jan. 2, 2002

(65) Prior Publication Data

US 2002/0089584 A1    Jul. 11, 2002

(30) Foreign Application Priority Data

Jan. 9, 2001    (JP) .............................. 2001-001828

(51) Int. Cl.
*H04N 7/18*    (2006.01)
(52) U.S. Cl. .................................................. 348/72
(58) Field of Classification Search .......... 348/59, 348/42–58, 60, 78–79, 72; 600/152, 476; 359/814; H04N 7/18
See application file for complete search history.

(56) References Cited

U.S. PATENT DOCUMENTS

| | | | | |
|---|---|---|---|---|
| 5,078,150 A | * | 1/1992 | Hara et al. .................. | 600/476 |
| 5,374,953 A | * | 12/1994 | Sasaki et al. ................. | 348/65 |
| 5,614,943 A | * | 3/1997 | Nakamura et al. ............. | 348/72 |
| 5,627,583 A | * | 5/1997 | Nakamura et al. ............. | 348/72 |
| 5,682,199 A | * | 10/1997 | Lankford ....................... | 348/72 |
| 6,669,629 B2 | * | 12/2003 | Matsui ........................ | 600/152 |
| 6,717,752 B2 | * | 4/2004 | Kanai .......................... | 359/814 |

* cited by examiner

*Primary Examiner*—Tung Vo
(74) *Attorney, Agent, or Firm*—Snider & Associates; Ronald R. Snider

(57) ABSTRACT

An electronic endoscope apparatus including: a first endoscope having a first imaging device; and a second endoscope having a second imaging device with a different pixel density and a second drive pulse generation circuit, wherein a processor unit, which connects the two endoscopes, comprises: a first drive pulse generation circuit for driving the first imaging device, a synchronization circuit for generating a synchronizing signal synchronous with the signal of the second drive pulse generation circuit, a switching circuit for activating the synchronization circuit when the second endoscope is connected, and a signal processing circuit for processing the signals obtained by the first imaging device and for processing the signals obtained by the second imaging device based on the synchronizing signal. By this configuration, a single processor unit will suffice even when employing an imaging device with a different pixel density.

1 Claim, 3 Drawing Sheets

ELECTRONIC ENDOSCOPE APPARATUS ADAPTABLE TO ENDOSCOPES EQUIPPED WITH IMAGING DEVICE WITH DIFFERENT PIXEL DENSITY

BACKGROUND OF THE INVENTION

This application claims the priority of Japanese Patent Applications No. 2001-1828 filed on Jan. 9, 2001 which is incorporated herein by reference.

1. Field of the Invention

The present invention relates to an electronic endoscope apparatus, specifically to a configuration of an electronic endoscope apparatus wherein electronic endoscopes having an imaging device with different pixel densities are connected to a common processor unit.

2. Description of the Prior Art

FIG. 3 shows the configuration of a part of a conventional electronic endoscope apparatus and, as shown in the figure, a CCD (Charge Coupled Device) 2, which is a solid-state imaging device, is disposed at the tip of an electronic endoscope 1. The endoscope 1 is configured to connect detachably to a processor unit 3, and the processor unit 3 is provided with a drive pulse generation unit 4 for generating drive pulses to drive the CCD 2 and a signal processing circuit 5 for performing various signal processing to form image signals (video signals) based on the output signal of the CCD 2. And the output of the signal processing circuit 5 is supplied to a monitor 6.

According to the configuration described above, although not shown in the figure, light is emitted from the tip part, and the object to be observed is imaged with the CCD 2 under the emitted light and, at the CCD 2, electric charges accumulated in each pixel are read out as the image information by the drive pulse generation circuit 4. Thus the drive pulse generation circuit 4 generates various drive pulses such as a horizontal drive pulse, a vertical drive pulse, and a sweep-out (SUB) pulse, and these drive pulses are provided to the CCD 2 and thereby the image information constituting the video signal is read out.

The output signal of the foregoing CCD 2 is supplied to the signal processing circuit 5, where various image processing such as correlated double sampling, amplification, and gamma correction are performed and, from the signal processing circuit 5, video signals such as R (Red), G (Green), B (Blue) signals or Y (Luminance)/C (Color) signals are outputted to the monitor 6. Consequently, an observation image of the object to be observed is displayed in color.

SUMMARY OF THE INVENTION

In the foregoing electronic endoscope apparatus, various types of electronic endoscopes 1, which have a built-in imaging device with different pixel densities as the CCD 2, are fabricated. For example, a endoscope with a reduced diameter, which utilizes a CCD 2 with fewer pixels than those of a conventional type, has been proposed, and there exists a endoscope with built-in CCDs 2 with different pixel densities to meet the need for higher resolution or to comply with different television standards. Since these CCDs 2 need to be driven by a drive signal which conforms to the pixel density of each CCD 2, the electronic endoscope 1 and the processor unit 3 in the configuration of FIG. 2 are designed in a single set corresponding to the pixel density of the CCD 2. Also, in the foregoing conventional drive pulse generation circuit 4, it is common practice to generate various drive signals in accordance with various conditions, such as the length of various electronic endoscopes 1, other than the foregoing pixel density.

However, fabricating a separate processor unit 3 to conform to each electronic endoscope 1 having a built-in CCD 2 with different pixel densities leads to unavoidable waste in terms of apparatus configuration or cost. Moreover, there is a problem in that there are limits in coping with the diversifying pixel density of CCD 2 when various requirements of different types of electronic endoscopes 1 need to be met by means of the foregoing drive pulse generation circuit.

Furthermore, there is proposed a type of apparatus of which electronic endoscope 1 comprises a drive pulse generation circuit which conforms to the pixel density of the CCD 2, and therefore there is a need for a processor unit to support both types of electronic endoscopes with and without the drive pulse generation circuit.

The present invention has been made in view of the above described problems, and its object is to provide an electronic endoscope apparatus which allows to conform to imaging devices with different pixel densities by use of a single processor unit, thereby avoiding any waste in terms of configuration or cost.

To achieve the above object, an embodiment of the invention according to claim 1 includes: a first endoscope having a first image device; a second endoscope having a second image device with a pixel density different from that of the foregoing first image device and having a second drive pulse generation circuit to generate a drive pulse to drive the second image device; and a processor unit for connecting the foregoing first or second endoscope, and is characterized in that the processor unit comprises: a first drive pulse generation circuit for generating a drive pulse to drive the foregoing first imaging device; a selection circuit for activating the second drive pulse generation circuit when the foregoing second endoscope is connected; a synchronization circuit for forming synchronizing signals in synchronous with the drive pulse of the foregoing second drive pulse generation circuit; and a signal processor circuit for performing image processing on the output signal from the foregoing first imaging device when the first electronic endoscope is connected and for performing image processing on the output signals of the second imaging device by inputting the synchronizing signals from the foregoing synchronization circuit.

An embodiment of the invention according to claim 2 is characterized in that the foregoing processor unit includes a determination circuit for automatically determining the type of the electronic endoscope connected to the foregoing processor unit, and the foregoing selection circuit and synchronization circuit are operated based on the determination results.

According to the foregoing configuration, at the processor unit, the type of the electronic endoscope is determined, for example, by inputting identifying information from the electronic endoscope, and when it is determined to be the first electronic endoscope, the imaging device is driven by the first drive pulse generation circuit in the processor unit, and video signals are processed with various timing signals which are formed based on the clock signal used on the first drive pulse generation circuit.

On the other hand, when it is determined to be the second electronic endoscope, the imaging device is driven by the second drive pulse generation circuit on the electronic endoscope, and synchronizing signals synchronized with the drive pulse of the second drive pulse generation circuit are formed. The synchronizing signals include, for example, horizontal synchronizing signals, vertical synchronizing signals, and the like, and sampling pulses of video signals and other timing signals are formed based on the synchronizing signals, and various image processing is performed.

In this way, the present invention allows to connect an electronic endoscope having a second imaging device with a different pixel density to the processor unit which includes the first drive pulse generation circuit to drive the first imaging device with a reference pixel density in the first electronic endoscope, and also allows to perform image processing on the signals outputted from each imaging device by a single processor unit.

DETAILED DESCRIPTION OF THE PREFERRED EMBODIMENTS

Figure 1:
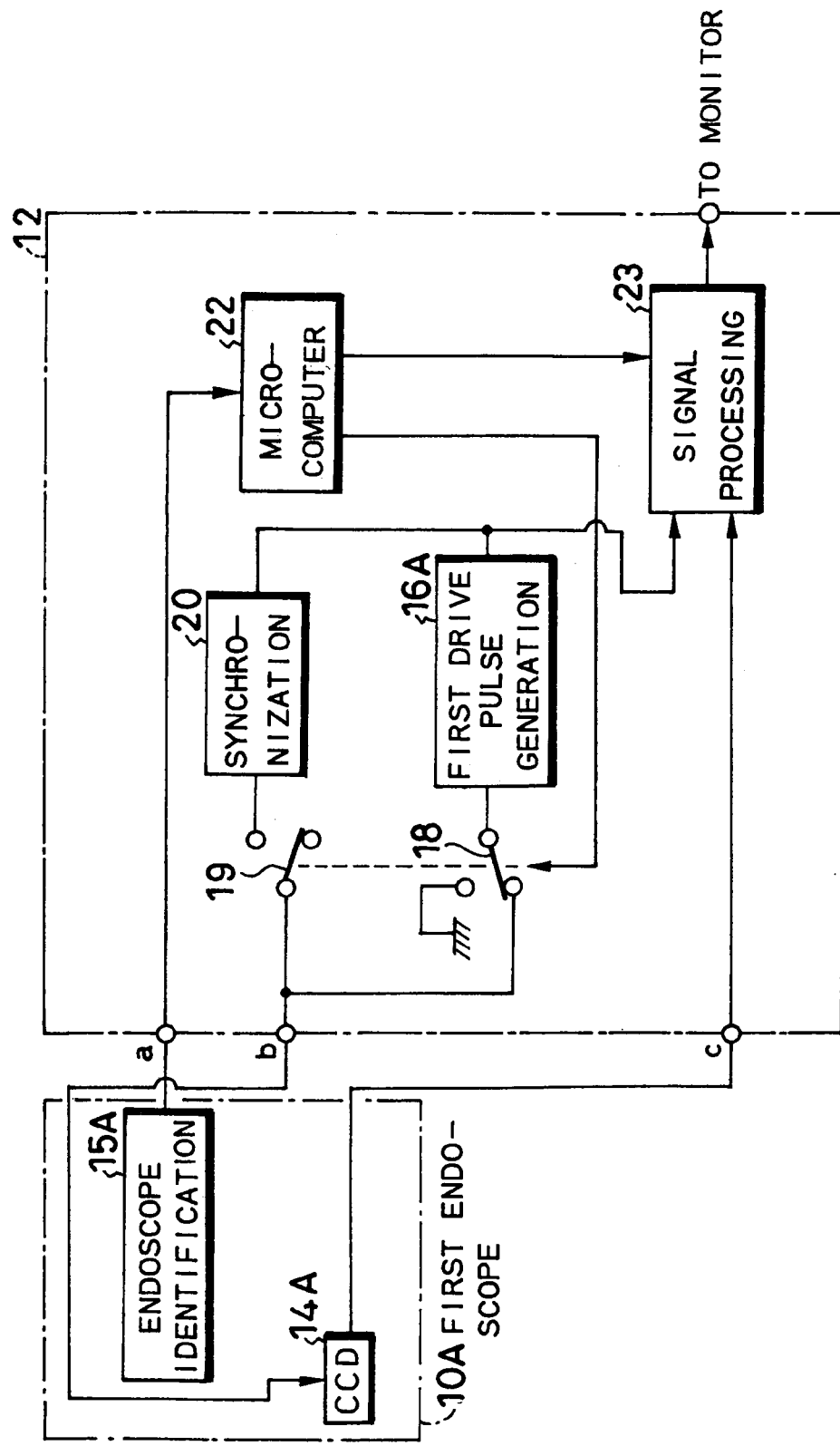
FIG. 1 is a block diagram showing the circuit configuration of the electronic endoscope apparatus according to an embodiment of the present invention with the first endoscope being connected.
Figure 2:
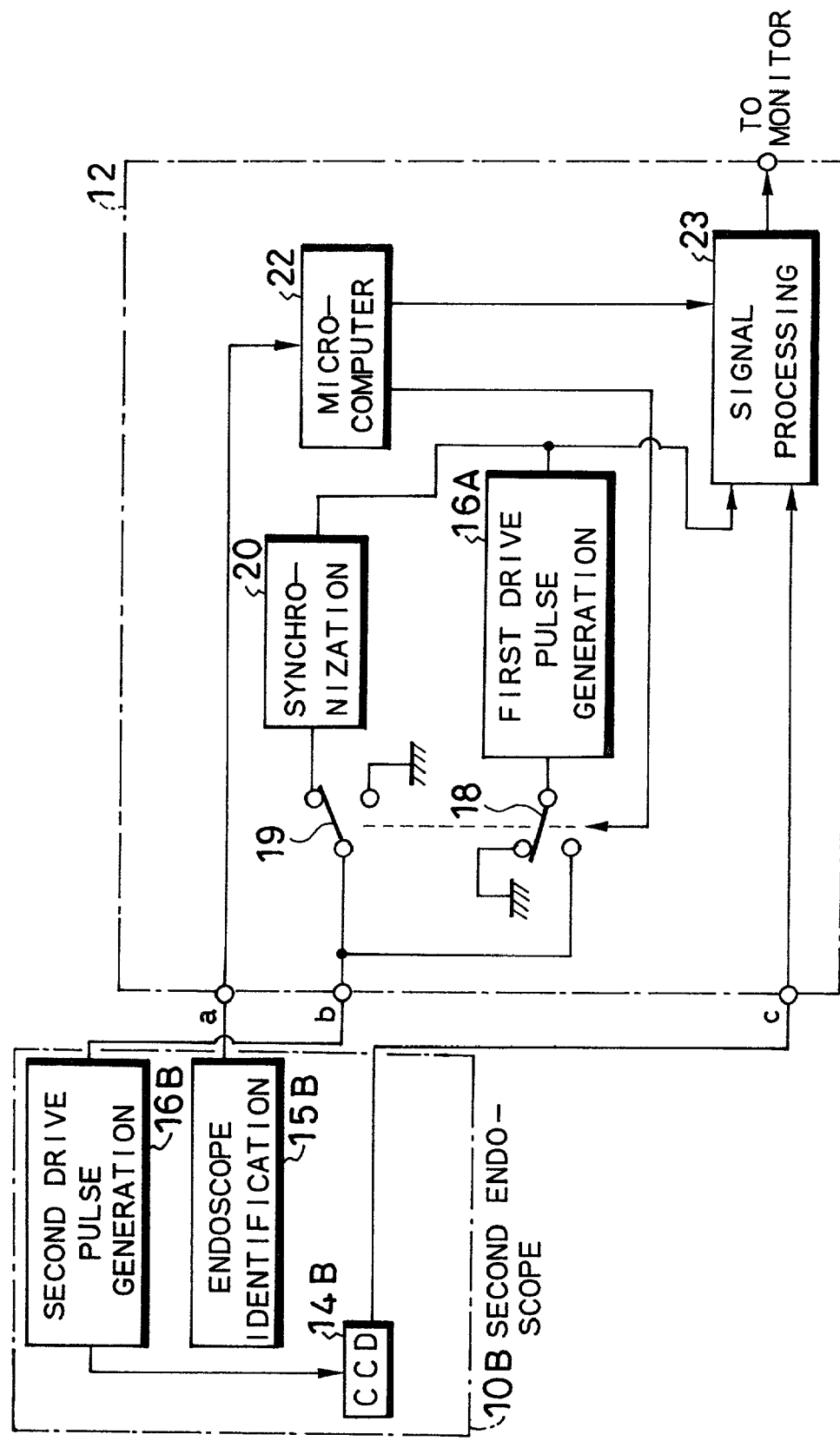
FIG. 2 is a block diagram of the electronic endoscope apparatus according to an embodiment with the second endoscope being connected.
Figure 3:
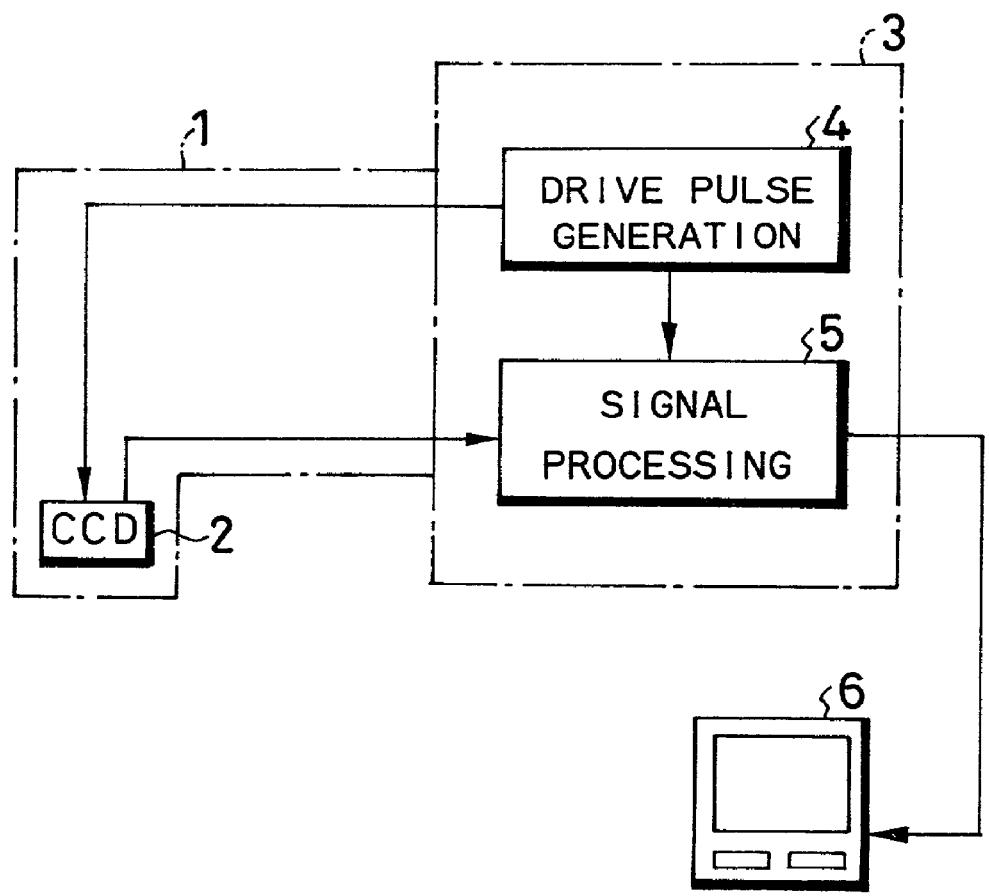
FIG. 3 is a block diagram showing a schematic configuration of a conventional electronic endoscope apparatus.

FIGS. 1 and 2 show the configuration of an electronic endoscope apparatus according to an embodiment of the present invention, and the apparatus, as shown in the figures, includes a first electronic endoscope (hereinafter referred to as endoscope) 10A and a second endoscope 10B, both of which are of a different type from one another and connectable to the processor unit 12. The first endoscope 10A in FIG. 1 includes, for example, a 410-kilo-pixel CCD 14A, which will capture the image of the object to be observed through an object lens system. Furthermore, the first endoscope 10A includes a endoscope identifying information generation module 15A. In this embodiment, identifying information which is specific to each endoscope and recorded on a storage medium such as an EEPROM is sent out by communication means, and the identifying information is read out and interpreted by a microprocessor 22 on the processing unit, which will be described later. It is also possible to use a shape identifying member placed at a connector junction as the identifying information generating unit 15A.

The second endoscope 10B in FIG. 2 includes, for example, a 270-kilo-pixel CCD 14B and a second drive pulse generator circuit 16B to drive the CCD 14B. This drive pulse generating circuit 16B generates various drive pulses such as a horizontal pulse, a vertical pulse, and a sweep-out (SUB) pulse. The second endoscope 10B also includes a endoscope identifying information generation unit 15B with a microprocessor.

On the other hand, the processor unit 12 includes a first drive pulse generation circuit 16A via a switching element 18, and connection/disconnection of the first drive pulse generation circuit 16A to/from the CCD 14A of the foregoing first endoscope 10A is switched by the switching element 18. The processor unit 12 also includes a synchronization circuit 20 via a switching element 19, and connection/disconnection of this synchronization circuit 20 to/from the second drive pulse generation circuit 16B of the foregoing second endoscope 10B is switched by the switching element 19.

Furthermore, the processor unit 12 includes a microprocessor 22 for switching control of the foregoing switching elements 18, 19 and for overall control of other parts and a signal processing circuit 23 to perform various image processing, and either the output signal of the CCD 14A of the first endoscope 10A or the output signal of the CCD 14B of the second endoscope 10B is inputted to the signal processing circuit, and image processing such as correlated double sampling, amplification, gamma correction, and the like is performed for these signals.

The embodiment being configured as described above, when the first endoscope 10A is connected to the processor unit 12 as shown in FIG. 1, the microcomputer 22 of the processor unit 12 recognizes that the connected endoscope is the first endoscope 10A (or 410-kilo-pixel CCD 14A) from the identifying information which is received from a endoscope identifier 15A. And the microcomputer 22 disconnects the synchronization circuit 20 and connects the first drive pulse generation circuit 16A to the CCD 14A by controlling the switching elements 18, 19 and activates the operation of the drive pulse generation circuit 16A.

In this case, based on the clock signals obtained on the oscillator of the processor unit 12, the drive pulse generation circuit 16A and the signal processing circuit 23 operate to generate video signals as in a conventional manner, and video signals such as R (Red), G (Green), B (Blue), or Y (luminance)/C (Color) are outputted to the monitor from this signal processing circuit 23.

On the other hand, as shown in FIG. 2, when the second endoscope 10B is connected to the processor unit 12, the foregoing microcomputer 22 recognizes that the connected endoscope is the second endoscope 10B (or 170-kilo-pixel CCD 14B) from the identifying information which is received from a endoscope identifier 15B and disconnects the first drive pulse generation circuit 16A and connects the synchronization circuit 20 to the second drive pulse generation circuit 16B by switching the switching elements 18, 19.

In this case, in the second endoscope 10B, the second drive pulse generation circuit 16B generates horizontal drive pulses, vertical drive pulses, sweep-out pulses, and the like based on the clock signal of the oscillator on the endoscope, and image signals are read out with these drive pulses from the CCD 14B, and these signals are supplied to the signal processing circuit 23. Also, from the foregoing second drive pulse generation circuit 16B, the foregoing horizontal drive pulse and the vertical drive pulse (or clock signal) are supplied to the synchronization circuit 20 and, at this synchronization circuit 20, horizontal synchronizing signals, vertical synchronizing signals, and other synchronizing signals are generated based on the foregoing signals and outputted to the signal processing circuit 23.

Therefore, in this signal processing circuit 23, sampling pulses and other timing signals for other signal processing are formed from the foregoing synchronizing signals, and various image processing are to be performed with these signals, and the image of the object to be observed will be displayed on the monitor with the video signals outputted from the signal processing circuit 23.

Although the second endoscope 10B has been described as one with a 170-kilo-pixel CCD 14B in the foregoing embodiment, but a high resolution CCD with more than 410 kilo-pixels or a CCD with pixel density conforming to a television standard other than NTSC may be used as the CCD 14B.

As described so far, in the embodiment, an electronic endoscope 10B having a CCD 14B with a different pixel density includes a drive pulse generation circuit 15B, and the processor unit 12 includes switching elements 18, 19 for the drive pulse generation circuit and is configured to generate signals synchronous with the signals used at other electronic endoscopes, thus allowing to readily connect a plurality of CCDs with different pixel densities by adding only a simple configuration to the processor unit 12.

As explained so far, according to the present invention, a second endoscope, which have a second imaging device and a second pulse generation circuit, is configured to be connectable to the processor unit which has the first drive pulse generation circuit to drive the first imaging device in the first electronic endoscope, and thus the video signal can be formed by the foregoing second imaging device as well, and therefore, a single processor unit will suffice even when using an electronic endoscope employing a CCD with a different pixel density and thus an electronic endoscope apparatus with minimized waste in terms of configuration and cost is achieved.

What is claimed is:

1. An electronic endoscope apparatus, including:
    a first electronic endoscope having a first imaging device;
    a second electronic endoscope having a second imaging device of which pixel density is different from that of said first image device, and having a second drive pulse generation circuit for generating drive pulses to drive the second imaging device; and
    a processor unit for connecting said first or (10A) second electronic endoscope,
    wherein the processor unit comprises:
    a first drive pulse generation circuit for generating drive pulses to drive said first imaging device;
    a selection circuit for activating the second drive pulse generation circuit when said second electronic endoscope (10B) is connected;
    a synchronization circuit for forming synchronizing signals which are synchronous with the drive pulse of said second drive pulse generation circuit;
    a signal processing circuit for performing image processing on the output signal from said first imaging device when said first electronic endoscope is connected, and for performing image processing on the output signal from the second imaging device by inputting the synchronizing signals from said synchronization circuit when the second electronic endoscope is connected; and
    wherein a determination circuit for automatically determining the type of the electronic endoscope which is connected to said processor unit is provided, and said selection circuit and synchronization circuit are operated based on the determination of the determination circuit.

* * * * *